United States Patent
Kuo et al.

(10) Patent No.: US 8,508,698 B2
(45) Date of Patent: Aug. 13, 2013

(54) DUAL-VIEW DISPLAY PANEL STRUCTURE AND METHOD FOR PRODUCING THE SAME

(75) Inventors: Wei-Hung Kuo, Hsinchu (TW); Weng-Bing Chou, Hsinchu (TW); Tsung-Chin Cheng, Hsinchu (TW); Chih-Jen Hu, Hsinchu (TW); Feng-Yuan Gan, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 1070 days.

(21) Appl. No.: 12/250,283

(22) Filed: Oct. 13, 2008

(65) Prior Publication Data
US 2009/0103024 A1    Apr. 23, 2009

(30) Foreign Application Priority Data
Oct. 19, 2007 (TW) ............................ 96139577 A

(51) Int. Cl.
- G02F 1/1333 (2006.01)
- G02F 1/13 (2006.01)
- H01J 9/00 (2006.01)
- H01L 21/00 (2006.01)
- B05D 3/00 (2006.01)

(52) U.S. Cl.
USPC ............ 349/110; 349/187; 445/58; 438/27; 438/29; 427/294

(58) Field of Classification Search
USPC .................. 349/110, 122, 137, 187; 445/24, 445/58; 438/27, 29–32; 427/294, 298, 331
See application file for complete search history.

(56) References Cited

U.S. PATENT DOCUMENTS

| | | | |
|---|---|---|---|
| 2003/0218708 A1* | 11/2003 | Ichihashi | 349/115 |
| 2006/0221633 A1* | 10/2006 | Yamauchi | 362/606 |
| 2006/0291243 A1* | 12/2006 | Niioka et al. | 362/607 |
| 2007/0058127 A1 | 3/2007 | Mather et al. | |
| 2007/0058258 A1 | 3/2007 | Mather et al. | |
| 2007/0146603 A1 | 6/2007 | Uehara et al. | |

FOREIGN PATENT DOCUMENTS

JP    2005-321449    11/2005

OTHER PUBLICATIONS

English language translation of abstract of JP 2005-321449.
Taiwan Office Action dated Jan. 4, 2012.

* cited by examiner

*Primary Examiner* — Uyen Chau N Le
*Assistant Examiner* — Michael Mooney
(74) *Attorney, Agent, or Firm* — McClure, Qualey & Rodack, LLP

(57) ABSTRACT

A dual view display structure and a method for producing the same are provided. First, a display panel is provided. Then, a patterned barrier layer is formed on a transparent substrate. The transparent substrate with the patterned barrier layer is attached to the display panel. Because there is a gap between the display panel and the patterned barrier layer, a liquid transparent material is injected into the gap to form a transparent material layer to fill the gap. The invention can not only increase the viewing angles of the dual view display, but also increase the production yield.

11 Claims, 7 Drawing Sheets

DUAL-VIEW DISPLAY PANEL STRUCTURE AND METHOD FOR PRODUCING THE SAME

This application claims the benefit from the priority of Taiwan Patent Application No. 096139577 filed on Oct. 19, 2007; the disclosure of which is incorporated by reference herein in their entirety.

CROSS-REFERENCES TO RELATED APPLICATIONS

Not applicable.

BACKGROUND OF THE INVENTION

1. Field of the Invention

The present invention relates to a liquid crystal display panel structure and a method for producing the same; and more particularly, to a dual-view display panel structure and a method for producing the same.

2. Descriptions of the Related Art

The dual-view display, which is mainly used as an on-board display, displays two-dimensional images at different angles for users to view different images from different angles. For example, by using a dual-view display, it is possible for passengers seated at different positions in a vehicle to view different images from a single display. In this way, the need to furnish a respective display for each individual is eliminated, thus saving associated costs and reduce the space occupied by the other displays in the vehicle.

A dual-view display operates primarily on the blocking effect provided by a patterned barrier layer. When users on both the left and right sides of the display view the same pixel on the pixel layer thereof, the blocking effect of the patterned barrier layer will prevent users on either side from viewing the pixel. As a result, users on both sides will view different images from each other, thus obtaining, a dual-view effect.

FIG. 1 illustrates an imaging process of a prior art dual-view display panel structure 10. The dual-view display panel structure comprises a second substrate 11, a liquid crystal (LC) layer 12, a pixel layer 13, a first substrate 14, a patterned barrier layer 15 and a transparent substrate 16, in which the patterned barrier layer 15 further comprises opaque barrier patterns 151, 152, 153 and 154. This structure differs from conventional single-view display panel structures mainly in that the blocking function of the patterned barrier layer 15 may result in a dual-view effect.

The principle under which a dual-view displaying effect is accomplished will now be described with reference to FIG. 1. When users on both the left and right sides of a left image on the pixel layer 13 view the same pixel, light directed from the pixel towards the right side will be blocked by the barrier pattern 152, while light directed towards the left side passes through the patterned barrier layer 15 directly without being blocked. Similarly, light directed from the right image towards the left side will be blocked by the barrier pattern 152, while the light directed from the right image towards the right side may propagate to users on the right side. Consequently, the pixel appears to display different images to users on different sides, thus, yielding a dual-view effect.

In producing a dual-view display panel of the prior art, there are a number of factors, such as the number of glass layers, uniformity of the thickness in the barrier layer, and size of the gaps, that may impact the production yield. Any of these factors may lead to the superimposition of the right and left images and consequently lead to a narrowed viewing angle range. Accordingly, it is highly desirable in the art to provide an improved method for producing a dual-view display panel to simplify the manufacturing process, promote the production yield, and widen the viewing angle range.

SUMMARY OF THE INVENTION

One objective of this invention is to provide a method for producing a dual-view display panel structure. This method improves the light transmission of the display panel and widens the viewing angle range by reducing the number of glass layers required in the display panel.

This method comprises the following steps: (1) providing a display panel which includes a glass substrate; (2) thinning the glass substrate to a predetermined thickness; and (3) forming a patterned barrier layer on the glass substrate.

Another objective of this invention is to provide a method for producing a dual-view display panel structure. According to this method, the problems caused by the uneven thicknesses in the transparent material layer, that is, the excessive gap distance between the substrates and consequent narrowed viewing angle range, can be ameliorated, thereby, increasing the production yield.

This method comprises the following steps: (1) forming a patterned barrier layer on the first substrate; (2) forming a transparent material layer on the patterned barrier layer; (3) forming a planarization layer on the transparent material layer; (4) forming a pixel layer on the planarization layer; and (5) assembling a second substrate with the first substrate to form a display panel.

Yet a further objective of this invention is to provide a dual-view display panel structure. By coating a planarization layer onto the transparent material layer of the display panel, a uniform overall thickness will be achieved, resulting in a reduced gap formation. This may widen the viewing angle range and hence, increase the production yield.

This structure comprises: a first substrate; a patterned barrier layer formed on the first substrate; a transparent material layer formed on the patterned barrier layer; a planarization layer formed on the transparent material layer; a pixel layer formed on the planarization layer; and a second substrate assembled with the first substrate to form a display panel.

Still another objective of this invention is to provide a method for producing a dual-view display panel structure. According to this method, gaps within the display panel are filled with a liquid transparent material, which may reduce defective images and increase the production yield of the display panel.

This method comprises the following steps: (1) providing a display panel and a transparent substrate; (2) forming a patterned barrier layer on the the transparent substrate; (3) attaching the first substrate with the patterned barrier layer to the display panel, wherein a gap is formed between the display panel and the patterned barrier layer; and (4) forming a transparent material layer by filling a liquid transparent material into the gap.

Still a further objective of this invention is to provide a dual-view display panel structure. By filling a liquid transparent material into a gap in the display panel, this structure improves the imaging defects of the panel structure in the prior art, thereby widening the viewing angle range of the display panel.

This structure comprises a display panel, a transparent substrate, a patterned barrier layer formed on the transparent substrate, and a transparent material layer formed in a gap between the patterned barrier layer and the display panel, wherein the transparent material layer is made of a liquid transparent material.

To summarize, this invention provides a dual-view display panel structure and a method for producing the same. With this invention, defective images are avoidable due to the improvements to the structure of the dual-view display panels of the prior art. Consequently, the viewing angle range of the display panel is widened and the production yield is increased.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

This invention relates to a dual-view display panel structure and a method for producing the same. Embodiments will be described below to explain this invention. However, these embodiments are not intended to limit the application or method of this invention in any specific context. Therefore, description of the embodiments is only intended to illustrate rather than to limit this invention. It should be noted that, in the following embodiments and attached drawings, elements unrelated to this invention are omitted from depiction.

Figure 1:
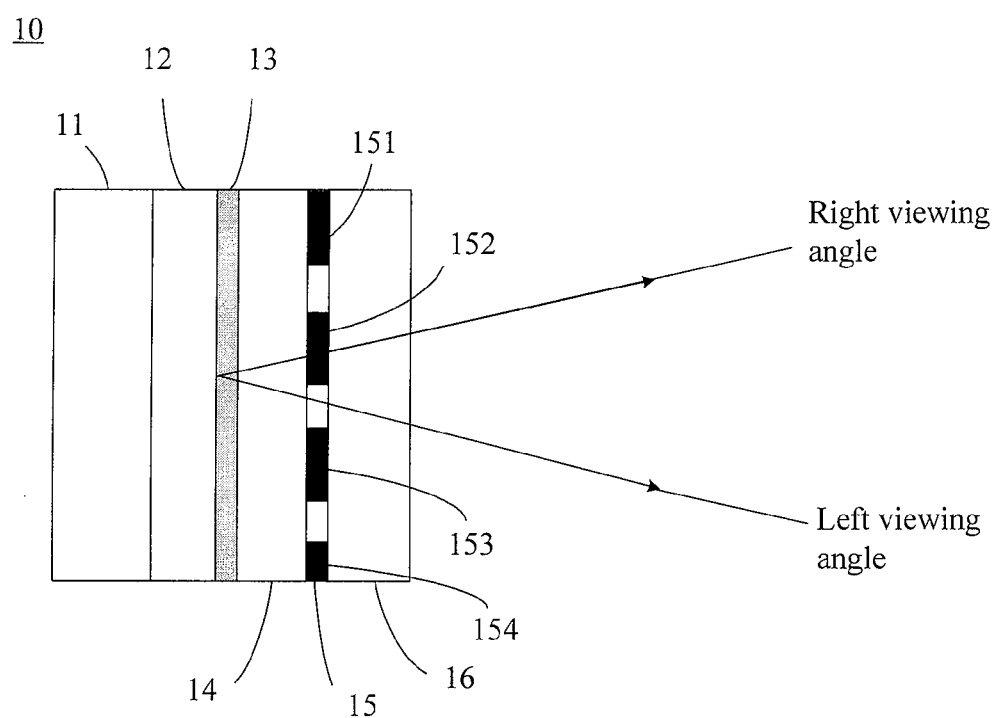
FIG. 1 illustrates an imaging structure of a dual-view display panel structure of the prior art.
Figure 2A:
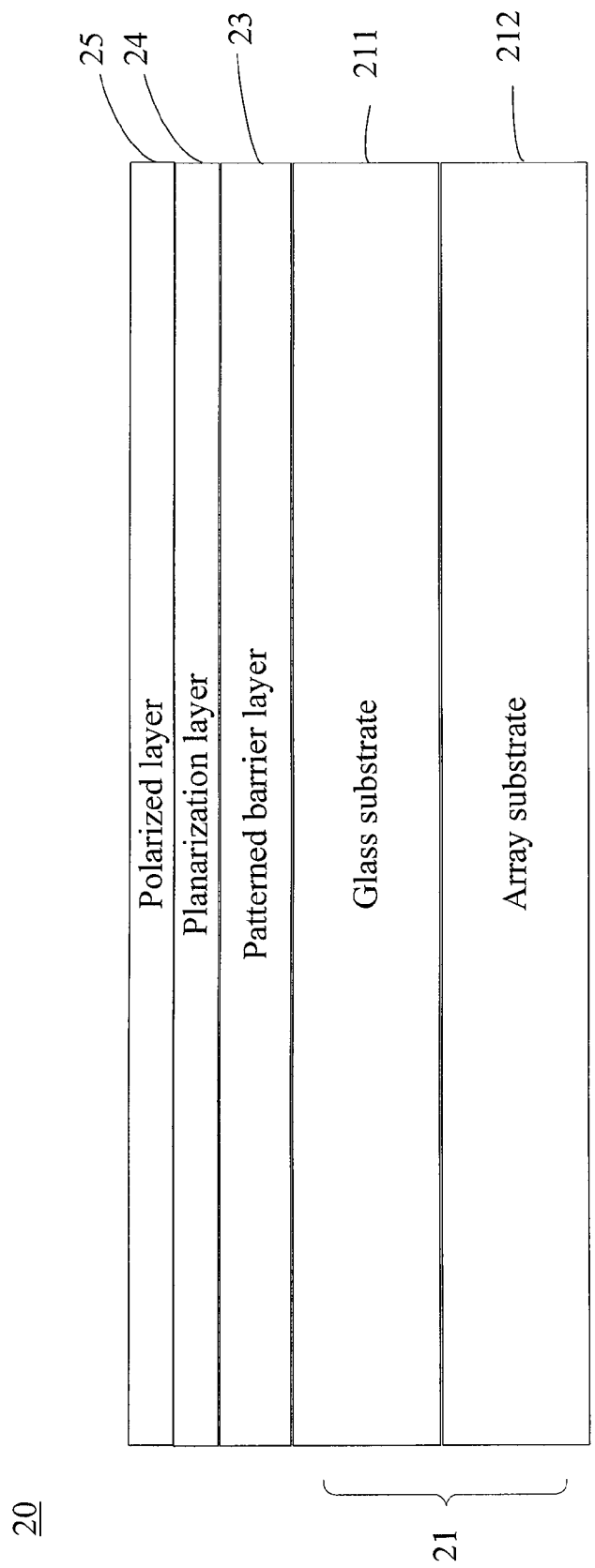
FIG. 2A illustrates a structure in accordance with the first embodiment of this invention.

FIG. 2A depicts the first embodiment of this invention, which is a dual-view display panel structure 20. The dual-view display panel structure 20 comprises a display panel 21, a patterned barrier layer 23, a planarization layer 24 and a polarized layer 25. The display panel 21 comprises at least one glass substrate 211, for example, a color filter substrate. In addition, the display panel 21 further comprises an array substrate 212, and may also comprise other conventional display elements, such as a pixel layer (not shown) formed on the glass substrate 211 and an liquid crystal (LC) layer (not shown) formed between the array substrate 212 and the glass substrate 211. The glass substrate 211 is adapted to form the patterned barrier layer 23 on a surface thereof. The patterned barrier layer 23 is adapted to yield a dual-view effect. The planarization layer 24 is an organic material layer formed on the patterned barrier layer 23 to provide a relatively planar surface so that the possibility of gap formation is mitigated during the assembly of the display panel. A method for producing the dual-view display panel structure 20 will be described in detail hereinafter.

Figure 2B:
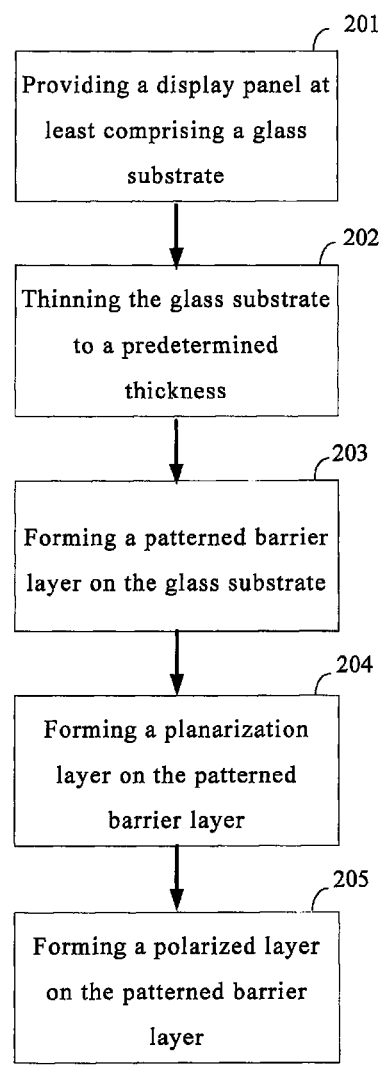
FIG. 2B is a flow diagram of a method in accordance with the first embodiment of this invention.

As shown in FIG. 2B, a flow diagram illustrates a process of producing the dual-view display panel structure 20. This process begins with step 201, in which the display panel 21 comprising at least one glass substrate 211 is provided. Next, in step 202, the glass substrate 211 is thinned to a predetermined thickness. Specifically, in this step, the glass substrate 211 is thinned to a thickness ranging from 30 µm to 200 µm, and in this embodiment, to a thickness of 50 µm. It should be noted that the thickness of the glass substrate 211 is interrelated with the width of an opaque pattern of the patterned barrier layer 23. In other words, in order for the patterned barrier layer 23 to yield a dual-view effect, the thickness of the glass substrate 211 should have a corresponding relationship with the width of the opaque pattern. Otherwise the dual-view imaging effect would be adversely disturbed. The glass substrate 211 can be thinned by means of a chemical mechanical polishing (CMP) method to be thinned in a completely uniform way.

After the thinning step, a patterned barrier layer 23 is formed on the glass substrate 211 in step 203. In this step, a barrier layer may be formed first on a surface of the glass substrate 211 subjected to the thinning treatment and then patterned to form a patterned barrier layer 23. Alternatively, a patterned barrier layer 23 may be formed directly on the glass substrate 211. With the aid of the blocking effect provided by these opaque barrier patterns, it is possible to yield a dual-view displaying effect.

The method of forming a barrier pattern will now be described in more detail. The first method is to print the patterned barrier layer 23 on the glass substrate 21 by screen printing. More specifically, in this method, an opaque black resin is printed onto the surface of the glass substrate 211 to directly form a barrier pattern. The resulting barrier pattern is then subjected to a baking process to volatilize the solvent contained in the resin thoroughly and have the reaction settled down completely, thus completing the production of the barrier pattern.

Another method is to form an opaque black resin on the glass substrate 211 and then pattern the opaque black resin. More specifically, in this method, an opaque black resin is coated on the surface of the thinned glass substrate 211, and is then subjected to an exposure and development process to remove the black resin in the transparent regions. The black resin in the opaque region is remained. Finally, the patterned black resin coating is subjected to a baking process at a high temperature to finish the complete reaction of the black resin, thus, obtaining a barrier pattern.

The barrier pattern may result in slight unevenness on the surface of the patterned barrier layer 23. In view of this, subsequent to formation of the patterned barrier layer 23, a planarization layer 24, i.e., an organic material layer, is optionally formed thereon in step 204. Finally, in step 205, a polarized layer 25 is formed on the patterned barrier layer 23.

According to the method for producing a dual-view display panel structure 20 of this embodiment, the patterned barrier layer 23 is formed directly on the glass substrate 211. Compared to the conventional method, this may reduce the number of glass layers required, thereby increasing light transmission and consequently, improve the dual-view imaging effect. Furthermore, it is also possible to obviate assembling errors which would otherwise tend to occur during the assembly of the two glass substrates.

Figure 3A:
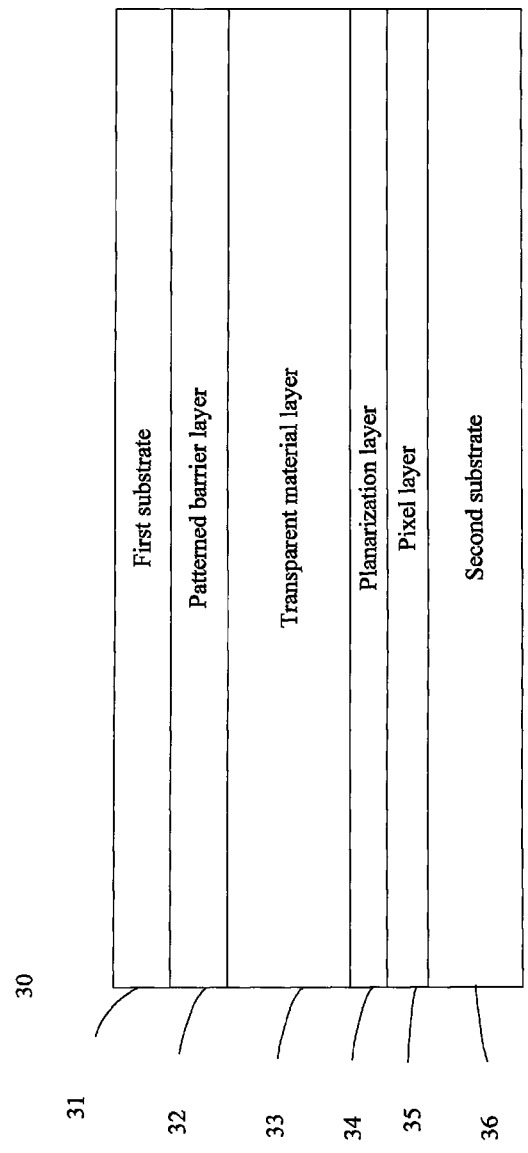
FIG. 3A illustrates a structure in accordance with the second embodiment of this invention.

FIG. 3A depicts a second embodiment of this invention, which is a dual-view display panel structure 30. The dual-view display panel structure 30 comprises a first substrate 31, a patterned barrier layer 32, a transparent material layer 33, a planarization layer 34, a pixel layer 35 and a second substrate 36.

The first substrate 31 is a glass substrate to be a color filter substrate. The patterned barrier layer 32 is formed on the first substrate 31 for yielding a dual-view effect. The transparent material layer 33, which is made of a transparent macromolecular material, is in turn formed on the patterned barrier layer 32 to combine with the patterned barrier layer 32 to yield a dual-view effect. The planarization layer 34, which is made of an organic material, is formed on the transparent material layer 33, and is adapted to control the uniformity in the thickness of the transparent material layer 33. The pixel layer 35 is formed on the planarization layer 34, and is for example, a color filter layer, in which the pixel positions are defined by a black matrix in the color filter layer. The second substrate 36 comprises an array layer (not shown) with a thin film transistor (TFT) array thereon, and is assembled with the first substrate 31 to form a display panel. When being assembled, the pixel layer 35 and the array layer are arranged to face inwards. A liquid crystal layer (not shown) is filled between the first substrate 31 and the second substrate 36, which is well-know to those skilled in the art and will not be described in detail herein.

In the dual-view display panel structure 30, the transparent material layer 33 is coated on the patterned barrier layer 32 by spin coating to a thickness ranging from 30 μm to 200 μm. For example, assuming that the transparent material layer 33 has a thickness of 50 μm and a coating uniformity of 3%, a thickness variation up to 1.5 μm would result in failing to satisfy the requirement of a less than 0.3 μm gap distance in the liquid crystal panel and lead to a decreased production yield. An excessively poor uniformity of the transparent material layer 33 would lead to exacerbated light scattering and consequently degrade a definition of images. In contrast, by forming a planarization layer 34 of about 4 μm in thickness on the transparent material layer 33, the overall uniformity in thickness can be controlled to be within 0.3 μm.

Figure 3B:
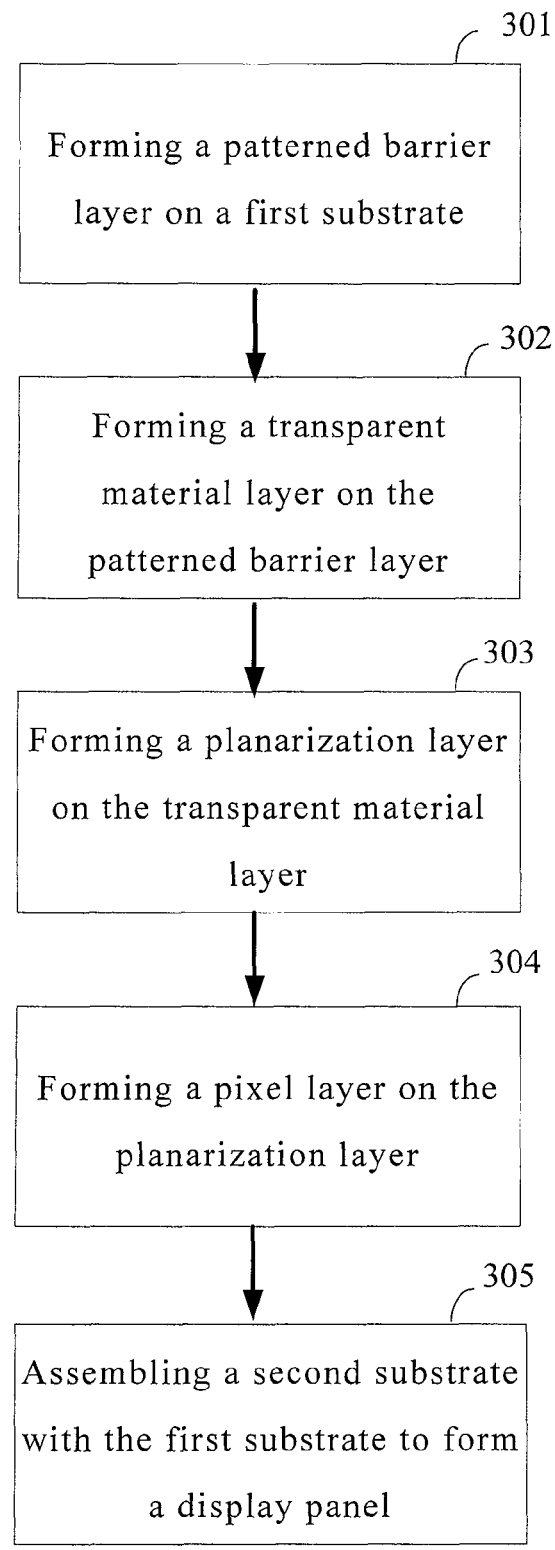
FIG. 3B is a flow diagram of a method in accordance with the second embodiment of this invention.

The process of producing the dual-view display panel structure 30 will now be described. As shown in FIG. 3B, this process begins with step 301, where a patterned barrier layer 32 is formed on the first substrate 31. Next, in step 302, a transparent material layer 33 is formed on the patterned barrier layer 32. In particular, the step of forming the transparent material layer 33 on the patterned barrier layer 32 is accomplished by spin coating the macromolecular material layer on the patterned barrier layer 32.

Then, in step 303, a planarization layer 34 is formed on the transparent material layer 33. In particular, this step is accomplished by spin coating an organic material layer on the transparent material layer 33. The organic layer used for the planarization layer 34 should have a low viscosity and high blanketing capability. Then, in step 304, a pixel layer 35, for example, a color filter layer, is formed on the planarization layer 34, and finally, in step 305, a second substrate 36 is assembled with the first substrate 31 to form a display panel.

According to the dual-view display panel structure 30 and the producing method thereof in this embodiment, the transparent material layer 33 is spin coated to a thickness of about 50 μm, and then, a planarization layer 34 is formed thereon to obviate the uneven thickness due to the improper control of process tolerance of the transparent material layer 33. This may minimize the loss of yield due to an uneven gap in the dual-view liquid crystal display panel.

Figure 4A:
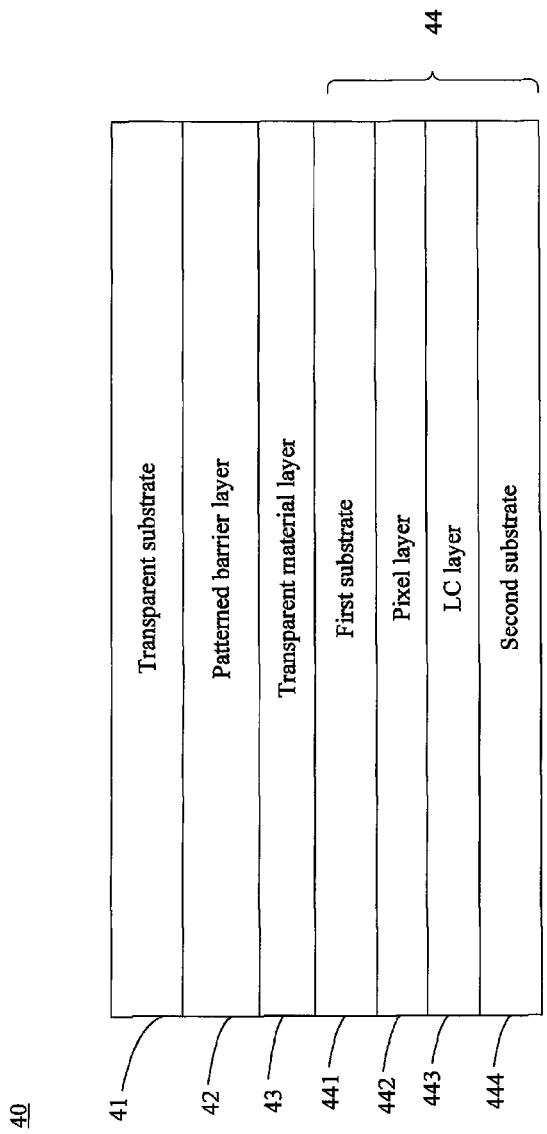
FIG. 4A illustrates a structure in accordance with the third embodiment of this invention.

FIG. 4A depicts a third embodiment of this invention, which is a dual-view display panel structure 40. The dual-view display panel structure 40 comprises a transparent substrate 41, a patterned barrier layer 42, a transparent material layer 43, and a display panel 44. The patterned barrier layer 42 is formed on the transparent substrate 41 for yielding a dual-view displaying effect. In application, the display panel 44 may comprise a first substrate 441, a pixel layer 442 formed on the first substrate 441, an LC layer 443 and a second substrate 444, in which the LC layer 443 is disposed between the pixel layer 442 and the second substrate 444. The transparent material layer 43 is made of a liquid transparent material and is formed in a gap between the patterned barrier layer 42 and the first substrate 441 of the display panel 44.

In this embodiment, the transparent substrate 41 with the patterned barrier layer 42 formed thereon is attached to the first substrate 441 of the display panel 44 to produce the dual-view display panel structure 40. However, when implemented, the display panel 44 and the patterned barrier layer 42 tend to have a gap formed therebetween, which may narrow the viewing angle range of the dual-view display significantly. In view of this, a liquid transparent material (e.g., optical oil) having a refractive index larger than that of the air is filled into the gap between the display panel 44 and the patterned barrier layer 42 to form a transparent material layer 43. Thus, by filling the gap entirely with such a liquid transparent material, the adverse impact imposed by the gap can be obviated.

Figure 4B:
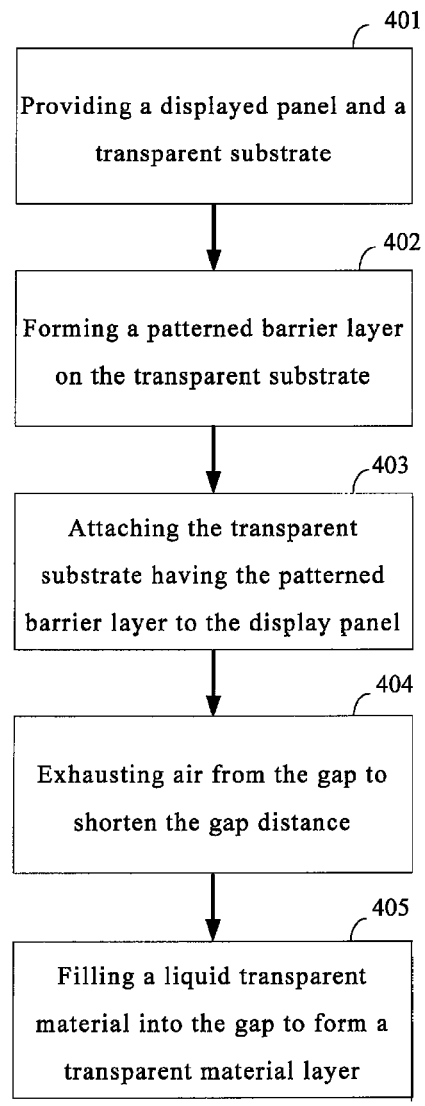
FIG. 4B is a flow diagram of a method in accordance with the third embodiment of this invention.

The process of producing the dual-view display panel structure 40 will now be described. FIG. 4B illustrates the flow diagram of a process for producing the dual-view display panel structure 40. This process begins with step 401, where a display panel 44 and a transparent substrate 41 are provided. Then, in step 402, a patterned barrier layer 42 is formed on the transparent substrate 41. Next, in step 403, the transparent substrate 41 with the patterned barrier layer 42 formed thereon is attached to the display panel 44. At this point, a gap will be formed between the display panel 44 and the patterned barrier layer 42.

Prior to filling a liquid transparent material into the gap, step 404 is executed to exhaust air from the gap to shorten the gap distance. This helps to achieve a higher precision when assembling the transparent material layer 41 with the display panel 44. Finally, in step 405, a liquid transparent material is filled into the gap to form a transparent material layer 43. The liquid transparent material is just as described above, and will not be described in detail herein.

According to the dual-view display panel structure 40 and the producing method thereof in this embodiment, a liquid transparent material is filled into the gap between the display panel 44 and the patterned barrier layer 42 to eliminate the adverse impact imposed by the gap. As a result, the viewing angle range of the display panel is widened. In addition, the production yield is also increased.

In summary, this invention provides a dual-view display panel structure and a method for producing the same. With the novel structure and producing method disclosed in this invention, it is possible to obtain a relatively larger viewing angle range, as well as increase the production yield on the other hand, thus, overcoming disadvantages of the prior art in these respects.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A method for producing a dual-view display panel structure, comprising the steps of:
providing a display panel having a display side and a transparent substrate disposed opposite to the display panel and facing to the display side of the display panel;

forming a patterned barrier layer on the transparent substrate and located between the transparent substrate and the display panel;

attaching the transparent substrate having the patterned barrier layer facing to the display panel, wherein a gap is formed between the display panel and the patterned barrier layer and between the transparent substrate and the display panel; and forming a transparent material layer by filling a liquid transparent material into the gap.

2. The method as claimed in claim 1, further comprising a step of exhausting air from the gap to decrease the gap distance.

3. The method as claimed in claim 1, wherein the liquid transparent material has a refractive index bigger than that of the air.

4. The method as claimed in claim 1, wherein the liquid transparent material is optical oil.

5. A dual-view display panel structure comprising:
a display panel having a display side;
a transparent substrate disposed opposite to the display panel and facing to the display side of the display panel;
a patterned barrier layer formed on the transparent substrate and located between the transparent substrate and the display panel; and
a transparent material layer made of a liquid transparent material being formed in a gap between the patterned barrier layer and the display panel and between the transparent substrate and the display panel.

6. The dual-view display panel structure as claimed in claim 5, wherein the refractive index of the liquid transparent material is bigger than that of the air.

7. The dual-view display panel structure as claimed in claim 5, wherein the liquid transparent material is optical oil.

8. The dual-view display panel structure as claimed in claim 5, wherein the display panel including:
a first substrate having the display side;
a pixel layer formed on the first substrate;
a second substrate; and
a liquid crystal layer located between the pixel layer and the second substrate.

9. The dual-view display panel structure as claimed in claim 5, wherein the patterned barrier layer comprises a plurality of opaque barrier patterns and a plurality of transparent barrier patterns alternately.

10. The dual-view display panel structure as claimed in claim 5, wherein the display panel displays at least an image from the display side and sequentially passing through the transparent material layer made of the liquid transparent material, the patterned barrier layer and the transparent substrate.

11. A display panel structure adapted to a dual-view display, the display panel structure comprising:
a display panel having a display side;
a transparent substrate disposed opposite to the display panel and facing to the display side of the display panel;
a patterned barrier layer formed on the transparent substrate and located between the transparent substrate and the display panel; and
a transparent material layer made of a liquid transparent material being formed in a gap between the patterned barrier layer and the display panel and between the transparent substrate and the display panel.

\* \* \* \* \*